United States Patent [19]

Matsuzaki et al.

[11] Patent Number: 5,627,569
[45] Date of Patent: May 6, 1997

[54] DISPLAY CONTROL APPARATUS AND METHOD WITH INITIALIZATION CAPABILITY

[75] Inventors: Eiichi Matsuzaki, Kawasaki; Hiroshi Nonoshita, Fujisawa; Takayuki Seki, Kawasaki, all of Japan

[73] Assignee: Canon Kabushiki Kaisha, Tokyo, Japan

[21] Appl. No.: 49,341

[22] Filed: Apr. 21, 1993

[30] Foreign Application Priority Data

Jun. 22, 1992 [JP] Japan .................................. 4-162946

[51] Int. Cl.⁶ .................................................. G09G 5/00
[52] U.S. Cl. ..................... 345/214; 345/211; 345/904; 345/185; 345/97; 395/651; 364/280.2
[58] Field of Search .................................. 395/162, 164, 395/700; 364/280.2; 345/52, 112, 97, 115, 185, 203, 211, 214, 904, 10

[56] References Cited

U.S. PATENT DOCUMENTS

| 4,641,157 | 2/1987 | Aoi | 346/160 |
| 5,233,446 | 8/1993 | Inoue et al. | 359/55 |

FOREIGN PATENT DOCUMENTS

| 59-112762 | 6/1984 | Japan . | |
| 62-116091 | 5/1987 | Japan . | |
| 63-228130 | 9/1988 | Japan . | |
| 63-243919 | 10/1988 | Japan . | |
| 1263099 | 10/1989 | Japan . | |
| 3296713 | 12/1991 | Japan | G09G 3/20 |

Primary Examiner—Kee M. Tung
Attorney, Agent, or Firm—Fitzpatrick, Cella, Harper & Scinto

[57] ABSTRACT

A display control apparatus and method initializes the display when the power is switched off. The display control apparatus includes a storing unit which corresponds to a display panel and stores display data, a display control unit for achieving an image on the display panel in accordance with the data stored in the storing unit, a detecting unit for detecting disconnection of a power source, and an initializing unit for initializing the storing unit when the detecting unit has determined that the power source is disconnected. The display control method performs display by using information stored in a memory corresponding to the display panel. The method is carried out by detecting a request for power disconnection, writing initialization data into the memory, achieving an image on the display panel by using the initialization data written in the memory, and disconnecting the power.

28 Claims, 8 Drawing Sheets

1

DISPLAY CONTROL APPARATUS AND METHOD WITH INITIALIZATION CAPABILITY

BACKGROUND OF THE INVENTION

1. Field of the Invention

The present invention relates to a display control apparatus and method and, more particularly, to an apparatus and a method for controlling a display apparatus comprising display devices which contain display acting media, such as ferroelectric liquid crystals, for display refreshment so as to retain the refreshed state achieved by, for example, application of an electric field thereto.

2. Description of the Related Art

Cathode-ray tube displays (referred to as "CRTs" hereinafter) are widely employed in information processing systems in order to display information. However, because a CRT essentially requires a relatively large dimension (or thickness) substantially perpendicular to its display surface, further size-reduction of CRTs is not easy. Because CRTs have relatively large volumes, a CRT employed in an information processing system limits the freedom of use of the system, such as the locations for installation or portability of the system.

The freedom of use of information processing systems can be increased by employing liquid crystal displays (referred to as "LCDs" hereinafter) because an LCD allows reduction of the size (particularly, the thickness) of the entire display apparatus.

Some LCDs comprise liquid crystal cells containing ferroelectric liquid crystals (referred to as "FLCs" hereinafter), and thus are called FLC display (referred to as "FLCD" hereinafter). One of the characteristics of FLCDs is that the liquid crystal cells retain a display state for a substantially long time. Therefore, unlike the cycles of driving of CRT displays or liquid crystal displays of other types, the cycles of continuous refresh driving of an FLCD can be relatively long, and partial rewrite driving can be performed separately from the continuous refresh driving. Partial rewrite driving achieves a display change in a desired portion of a display frame. Therefore, the display panels of FLCDs can be made larger than the display panels of other types of liquid crystal displays.

FLCDs have liquid crystal cells which have substantially reduced thicknesses and contain long and narrow FLC molecules. The FLC molecules are bistable; more specifically, they are oriented in either the first stable state or the second stable state in accordance with the direction of an electric field applied thereto, and remain in the state after application of the electric field has been discontinued. Because of the bistability of FLC molecules, FLCDs have memory effect (or display-state retainability). FLCs and FLCDs are described in detail in, for example, Japanese Patent Application Laid-open No. 63-243919 and U.S. patent application Ser. No. 174,862, filed on Mar. 29, 1988.

However, the memory effect (or display-state retainability) of FLCDs causes problems. Because an FLCD latently retains an image which the FLCD displayed when it was last switched off, the FLCD displays the retained image, when powered on, for an instant before a starting image is displayed. Further, while being powered off, the image latently retained by an FLCD may be made visible by light incident thereon. The image thus latently retained by an FLCD, for example, an image carrying confidential information, could be viewed by someone who should not see such information.

SUMMARY OF THE INVENTION

Accordingly, an object of the present invention is to provide a display control apparatus and method by which when a power-off operation is detected, the state of the memory means corresponding to a display frame is initialized so as to erase an image currently displayed. By such an operation, an image corresponding to the output data of the initialized memory means is retained by the FLCD due to bistability of FLCs after the power has been switched off, and this image will be displayed when the display apparatus is switched on. Thus, the display control apparatus and method of the present invention eliminate display of an undesired image when the power is switched on, and achieve smooth and sophisticated start-up of the display apparatus.

In accordance with one aspect of the invention, a display control apparatus comprises storing means for storing display data to be displayed on a display panel, display control means for achieving an image on the display panel in accordance with the data stored in the storing means, detecting means for detecting disconnection of a power source, and initializing means for initializing the storing means when the detecting means has determined that the power source is disconnected.

In accordance with another aspect of the invention, a display control method for displaying images on a display panel in accordance with information stored in a memory comprises the steps of detecting a request for power disconnection, writing initialization data into the memory, achieving an image on the display panel by using the initialization data written in the memory, and disconnecting the power.

In accordance with yet another aspect of the invention, an information processing system comprises display means, including a display panel, for displaying information, storing means for storing information to be displayed on the display panel, display control means for achieving an image on the display means in accordance with the information stored in the storing means, and power means for supplying power to the information processing system. In addition, switch means switches the power means on and off, detecting means detects the operations of the switch means, and initializing means initializes the storing means when the detecting means has determined that the switch means is operated.

Further objects, features and advantages of the present invention will become apparent from the following description of the preferred embodiments with reference to the attached drawings.

DETAILED DESCRIPTION OF THE PREFERRED EMBODIMENTS

The preferred embodiments of the present invention will be described in detail hereinafter with reference to the attached drawings.

Figure 1:
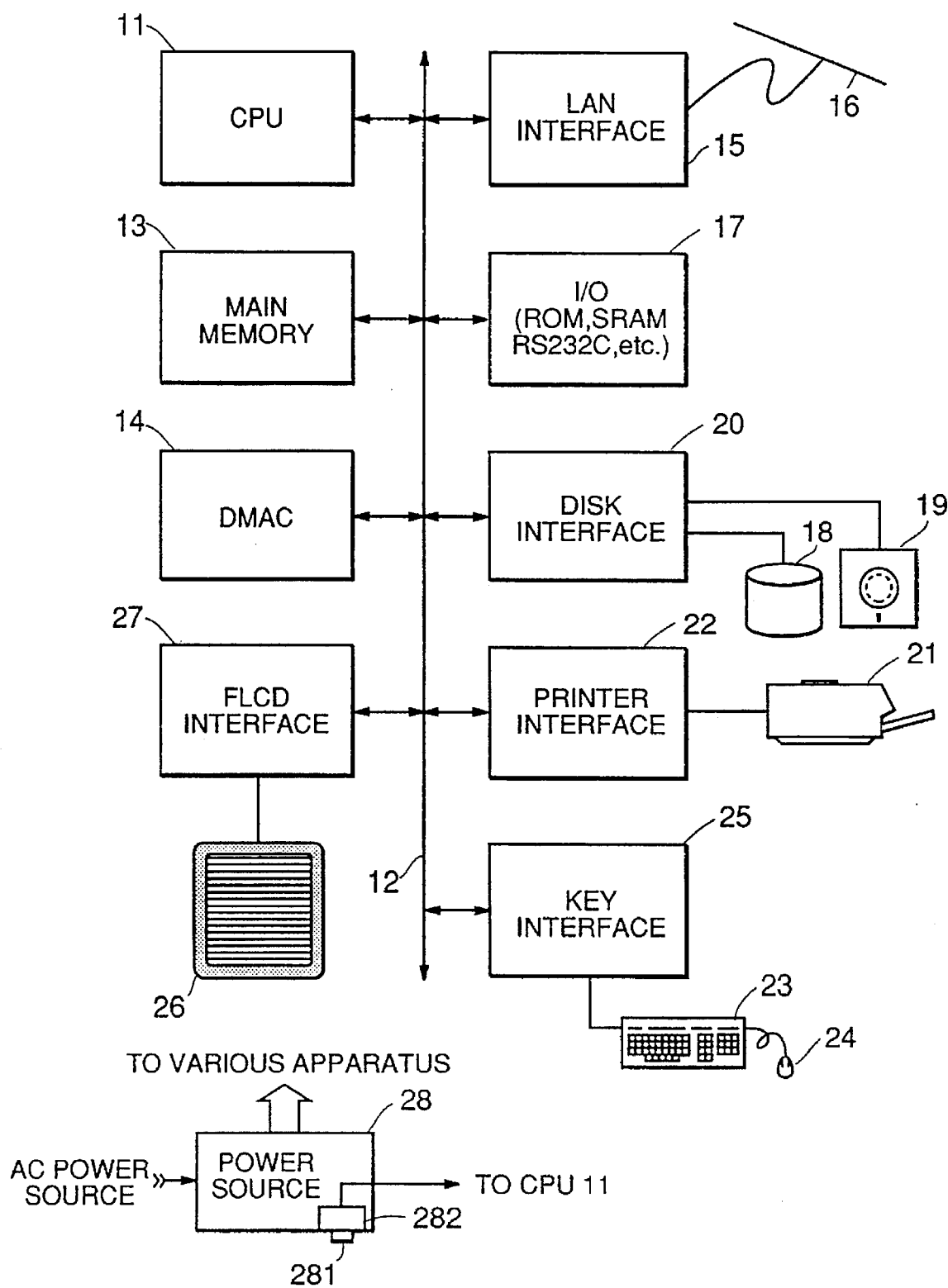
FIG. 1 is a block diagram of an information processing system incorporating a display control apparatus according to an embodiment of the present invention.
Figure 2:
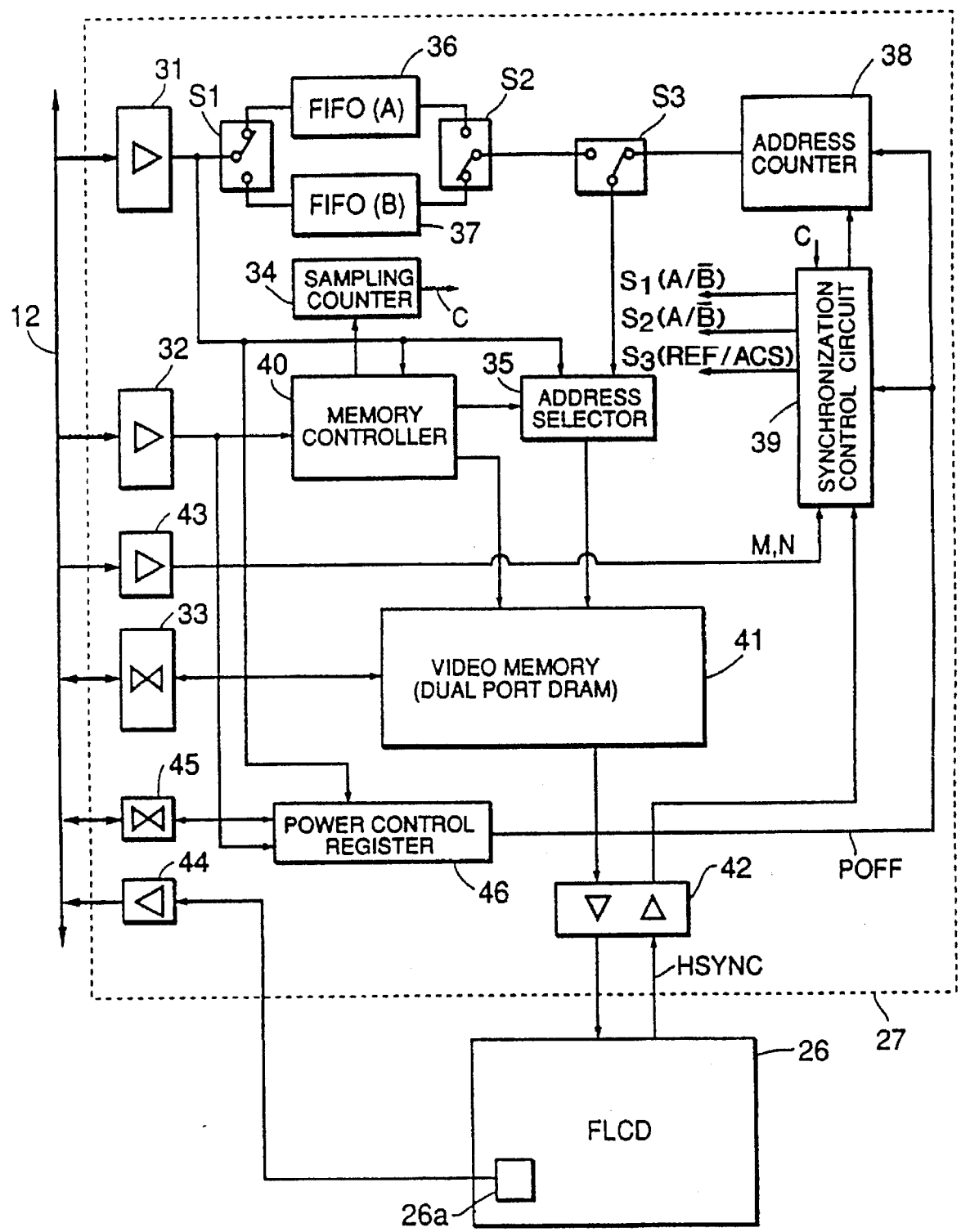
FIG. 2 is a block diagram of an FLCD interface according to a first embodiment of the preset invention.
Figure 5:
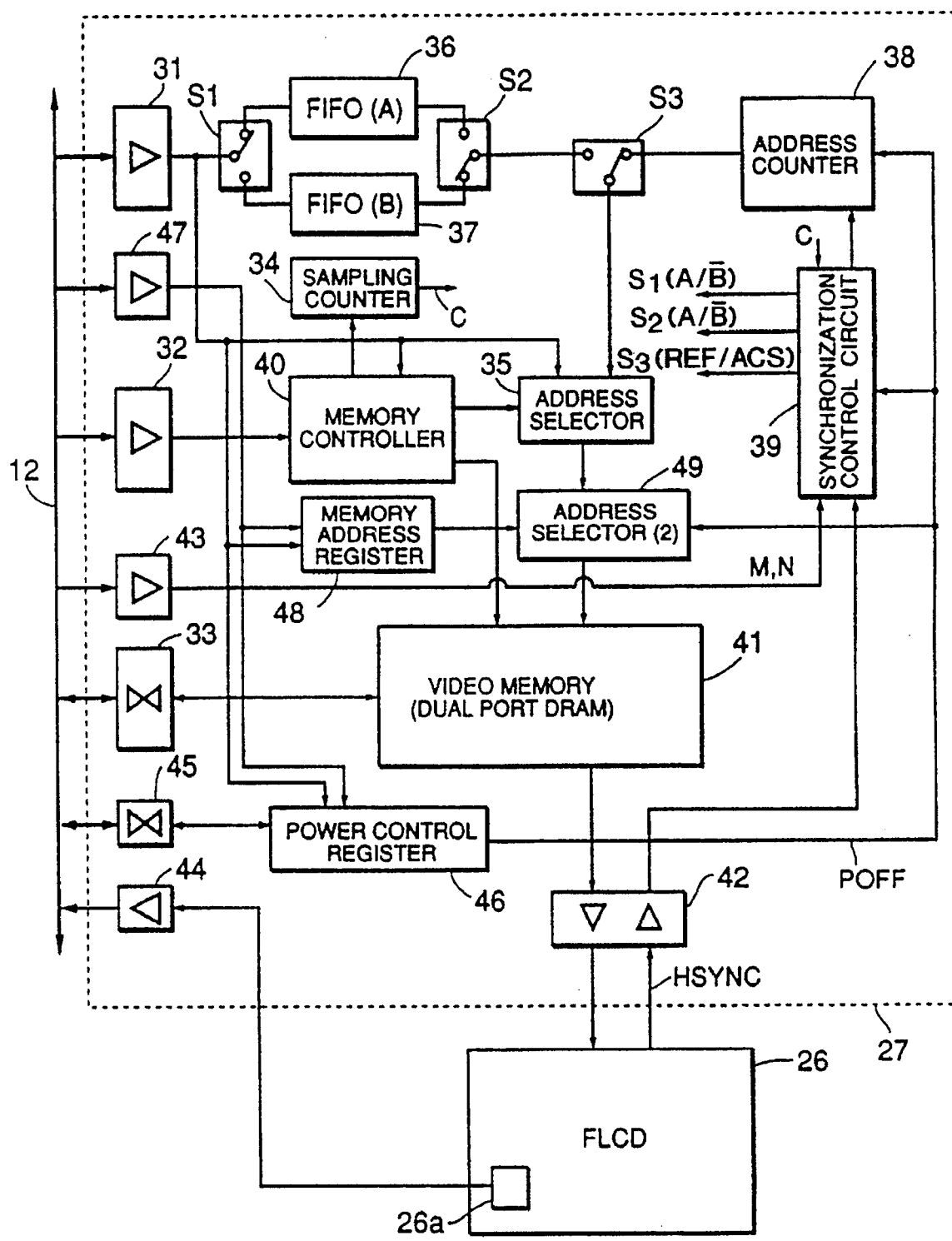
FIG. 5 is a block diagram of an FLCD interface according to a second embodiment of the present invention.
Figure 7:
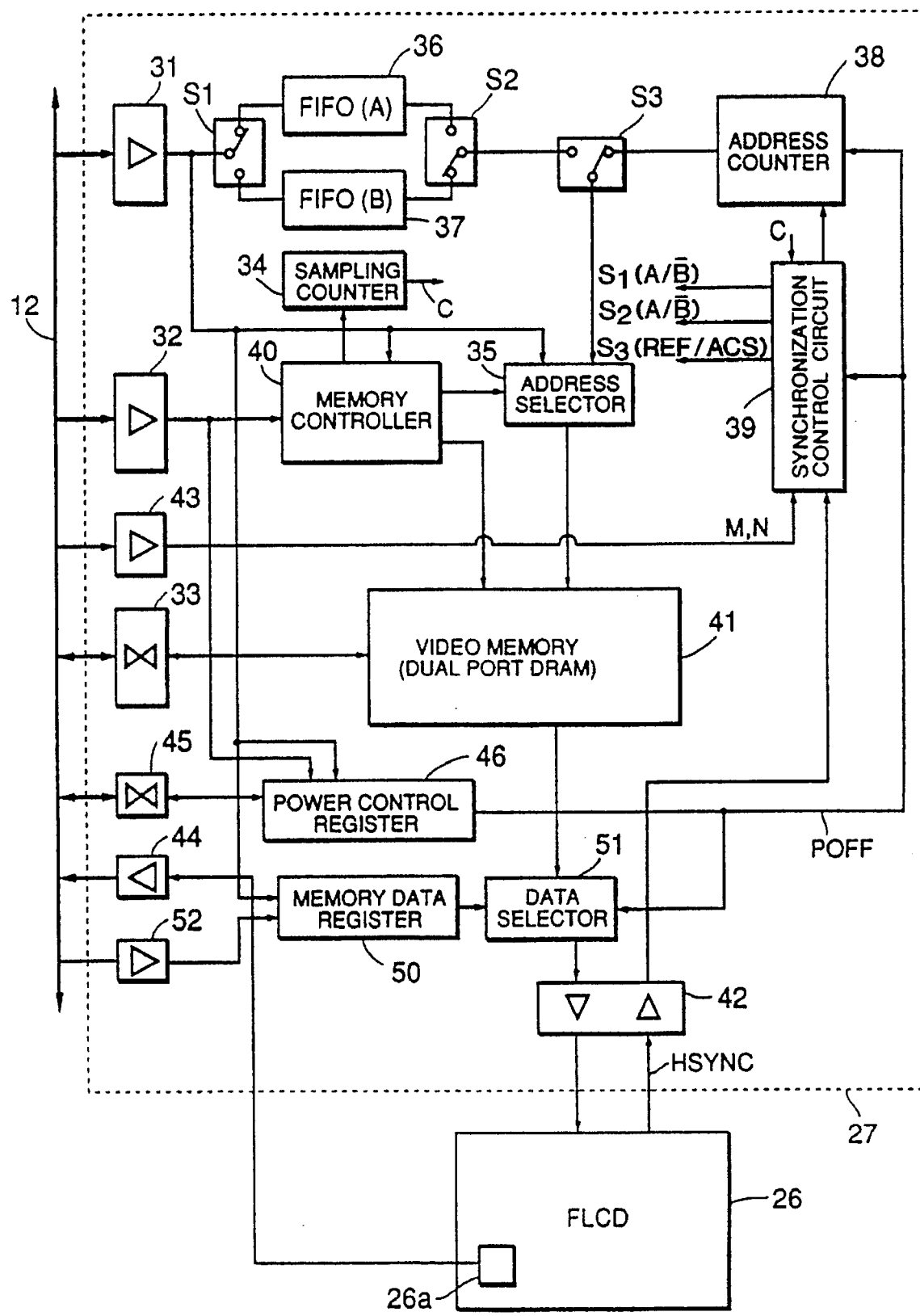
FIG. 7 is a block diagram of an FLCD interface according to a third embodiment of the present invention.

Each of the elements shown in block outline in FIG. 1, as well as in FIGS. 2, 5 and 7, is well known per se, and a specific type of construction is not critical to carrying out the invention or for a disclosure of the best mode a for carrying out the invention.

FIG. 1 illustrates an information processing system incorporating an FLC display equipped with a display control apparatus according to an embodiment of the present invention. The information processing system comprises a CPU (central processing unit) 11 for controlling the entire system, a main memory 13 which stores programs to be executed by the CPU 11 and is used as a working area when the CPU 11 executes any of the programs, a direct memory access controller (referred to as a "DMAC") 14 for communicating data with various component units of the information processing system without being controlled by the CPU 11, a LAN interface 15 for interfacing the system and a local area network (LAN) 16 such as an ETHERNET™ (Xerox), an input/output device (referred to as an "I/O") 17 comprising a ROM, an SRAM, an RS232C interface, etc., the I/O 17 being connectable to various external apparatuses, external memory units 18 and 19, more specifically, a hard disk device 18 and a floppy disk device 19, a disk interface 20 for transferring signals between the system and the hard disk device 18 and the floppy disk device 19, and a printer 21, such as an ink jet printer or a laser beam printer, having a relatively high print-resolution. Also provided are a printer interface 22 for transferring signals between the system and the printer 21, a key board 23 for inputting various characters and symbols and control commands, a mouse 24 serving as a pointer device, a key interface 25 for transferring signals from the key board 22 and the mouse 23 to the system, an FLCD 26 having a display panel containing ferroelectric liquid crystals (FLCs) which serve as display acting media; an FLCD interface 27, that is, a display control apparatus according to this embodiment of the present invention, which controls the display operation of the FLCD 26, system buses 12 including a data bus, a control bus and an address bus for transferring signals between the above-mentioned units, and a power source 28 for supplying predetermined amounts of power to the units and devices. The power source 28 is switched on and off by means of a hardware switch 281. The operation of the hardware switch 281 is monitored by a switch monitor 282, which accordingly sends a signal to the CPU 11.

A user (or an operator) of the above-described information processing system composed of the interconnected units and devices operates the system in response to various information displayed on the display panel of the FLCD 26. More specifically, the FLCD 26 displays information in the form of characters, images or the like received from the LAN 16, various external apparatuses connected to the I/O 17, the hard disk device 18, the floppy disk device 19, the key board 23 and the mouse 24, and it further displays operational information supplied from the main memory 13 in response to the operation performed by the user. While watching such information displayed on the FLCD 26, the user collects necessary information and operates the system.

These units, devices and apparatuses constitute means for supplying information to the FLCD 26.

EMBODIMENT 1

FIG. 2 illustrates in detail an FLCD interface 27 according to Embodiment 1 of the present invention. The FLCD interface 27 has an address bus driver 31, a control bus driver 32, and data bus drivers 33, 43, 44 and 45 which are respectively connected to the corresponding system buses 12. Address data from the CPU 11 is transferred through the address bus of the system buses 12 and the address bus driver 31 to a memory controller 40 and one of the two input terminal portions of an address selector 35. The address data is also transferred to either a FIFO memory (A) 36 or a FIFO memory (B) 37 selectively by means of a first switch S1. The FIFO (first-in first-out) memories (A) and (B) (referred to as "FIFO (A)" and "FIFO (B)", respectively, hereinafter) 36, 37 store address data in sequence so that the earliest written-in data is read out first and the latest written-in data is read out last. The address data stored in the FIFO (A) 36 and the FIFO (B) 37 are read out selectively by means of a second switch S2.

The address data thus read out from the FIFOs 36, 37 and the address data read out from an address counter 38 (described later) are transferred to the other input terminal portions of the address selector 35 selectively by means of a third switch S3. The address counter 38 generates address data for line-sequential refreshment of the entire frame. The timing of generation of address data by the address counter 38 is controlled by a synchronization control circuit 39. The synchronization control circuit 39 also generates switch control signals for controlling the operations of the switches S1, S2 and S3 and data transfer request signals directed to a memory controller 40. Further, the address counter constantly receives a power-off request signal (referred to as a "POFF signal" hereinafter) transmitted through the data bus driver 45 and a power control register 46. When the POFF signal is turned active, the address counter 38 forces the switch S3 to connect the output of the address counter 38 to the address selector 35.

Control signals generated by the CPU 11 are transmitted through the control bus of the system buses 12 and the control bus driver 32 to the memory controller 40, which then accordingly generates control signals for controlling the address selector 35, a sampling counter 34 and a video memory 41. The sampling counter 34 counts stepping signals transmitted from the memory controller 40 and accordingly generates control signals for controlling the synchronization control circuit 39. In accordance with the control signal from the memory controller 40, the address selector 35 selectively passes one of the two address data inputted through the two input terminal portions of the address selector 35 to the video memory 41.

The video memory 41 is a dual-port DRAM (dynamic RAM) that stores display data. Display data is written into and read out from the video memory 41 via the data bus of the system buses 12 and the data bus driver 33. The display data written in the video memory 41 is transferred through a driver receiver 42 to the FLCD 26, which then displays information based on the display data. The driver receiver 42 transfers a synchronization signal from the FLCD 26 to the synchronization control circuit 39.

The synchronization control circuit 39 also receives data for determining, for example, a proportion of partial-rewrite driving to refresh driving.

The power control register 46 is operated to turn the POFF signal active so that the POFF signal requests for initialization of a displayed frame when a power-off request has been made.

The FLC panel of the FLCD 26 has a temperature sensor 26a for detecting the temperature of the FLC panel. Signals outputted from the temperature sensor 26a are transmitted through the data bus driver 44 and the data bus of the system buses 12 to the CPU 11.

To make a display change, the CPU 11 sends to the memory controller 40 address data corresponding to the data to be rewritten in the video memory 41. When receiving the address data, the memory controller 40 arbitrates between a memory access request signal received from the CPU 11 and a data transfer request signal received from the synchronization control circuit 39. Subsequently, when the memory access request of the CPU 11 is accepted, the memory controller 40 switches the address selector 35 so that the address selector 35 transfers the address data coming directly from the address bus driver 31, that is, the address data indicating the addresses concerning the data rewriting by the CPU 11, to the video memory 41, instead of the address coming via the switch S3. Simultaneously, the memory controller 40 transmits a control signal to the video memory 41. As a result, the data at the designated address in the video memory 41 is rewritten into the data transferred thereto via the data bus driver 33. The address data received from the CPU 11 is stored in either the FIFO (A) 36 or the FIFO (B) 37 selectively by means of the switch S1 and used for display data transfer described later. As described above, the CPU 11 accesses display data substantially the same method as in an information processing system incorporating a CRT display.

To read out data from the video memory 41 and transfer the data to the FLCD 26, the synchronization control circuit 39 transmits a data transfer request signal to the memory controller 40. In response to the this signal, the memory controller 40 causes the address selector 35 to transfer the address data coming through the switch S3 from either address counter 38 or one of the FIFOs 36, 37, instead of the address data coming directly from the address bus driver 31. As a result, the display data on the line corresponding to the address data received from the address selector 35 is transferred from a memory cell to a shift register in the video memory 41, and then outputted to the driver receiver 42 in accordance with a control signal from a serial port of the video memory 41.

The synchronization control circuit 39 causes either entire-frame refresh cycles or partial-rewrite cycles for rewriting the lines accessed by the CPU 11, selectively by operating the switch 3 in accordance with a horizontal synchronization signal HSYNC. During an entire-frame refresh cycle, the lines constituting a display frame are sequentially driven. More specifically, the line to be driven is sequentially shifted from one line to the next, corresponding to the address serially incremented by the address counter 38. During a partial rewrite cycle, a line accessed by the CPU 11 within a predetermined time immediately before the partial rewrite cycle is rewritten.

The operation performed when a power-off request has been made will be described hereinafter.

Figure 3:
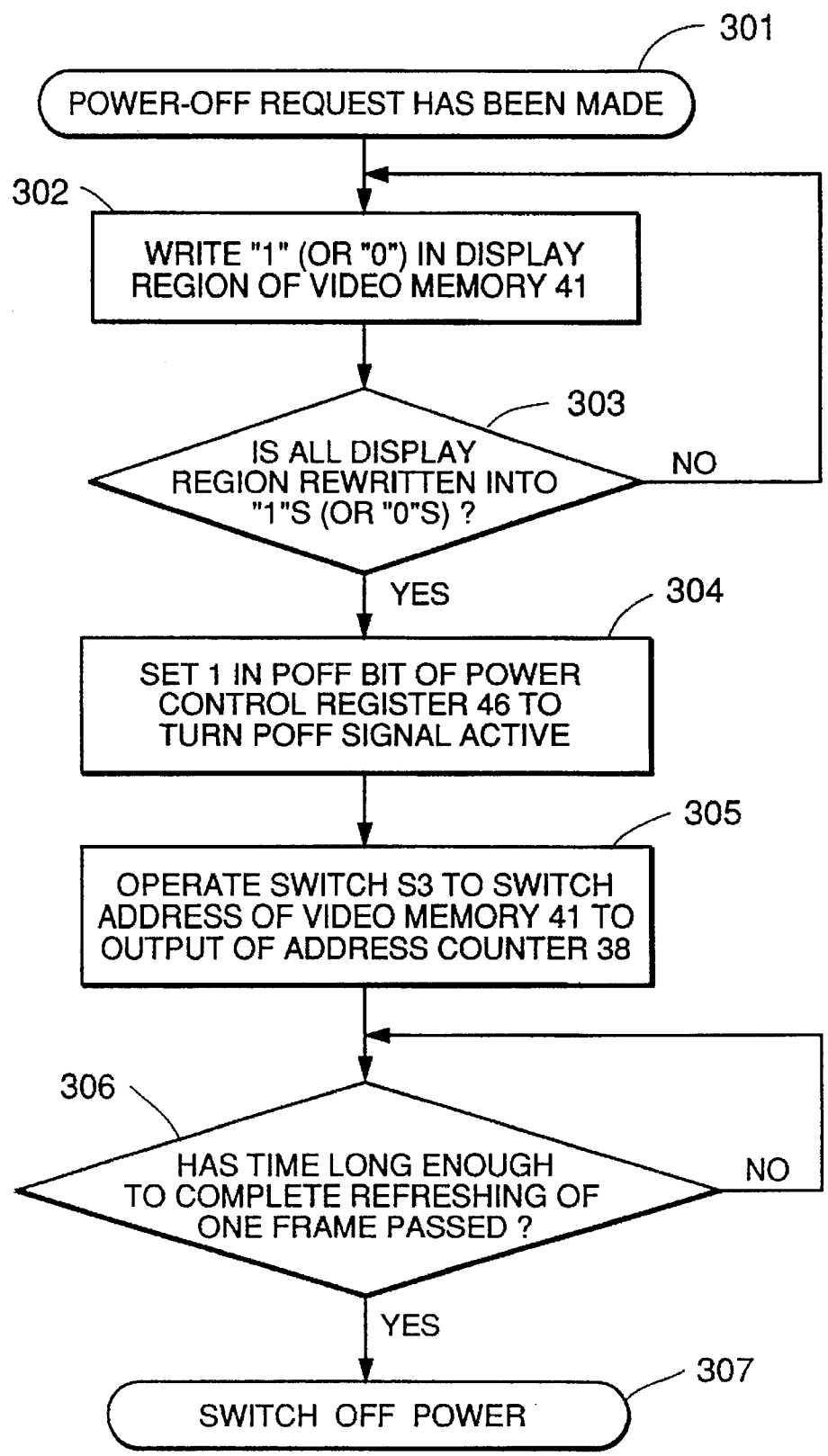
FIG. 3 is a flowchart of an operation performed when a power-off request has been made in a display control apparatus according to the first embodiment.
Figure 4:
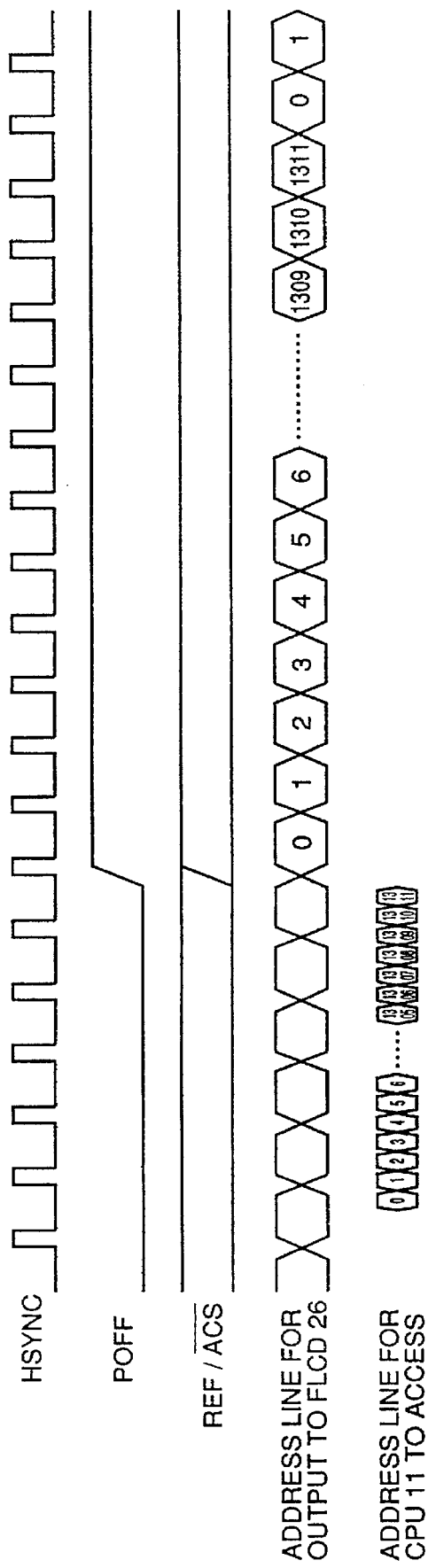
FIG. 4 illustrates the timings of various signals corresponding to the flowchart shown in FIG. 3.

FIGS. 3 and 4 illustrate a processing routine and timing of various signals, respectively, when a power-off request has been made.

Figure 8:
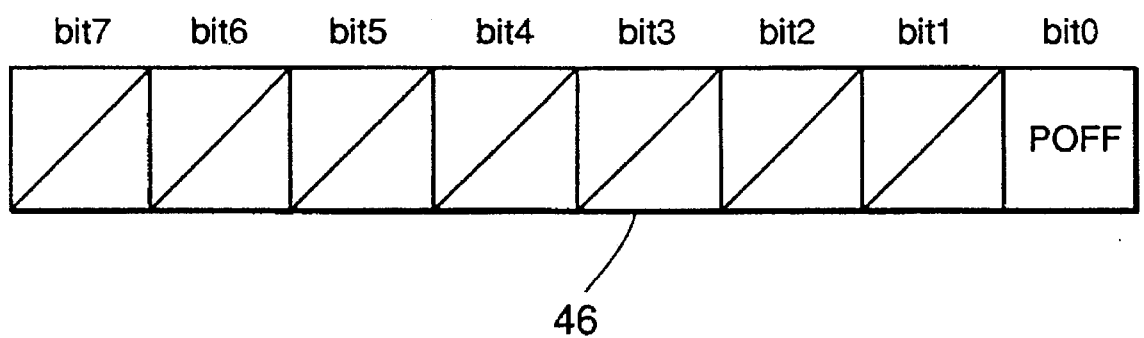
FIG. 8 illustrates a power control register used in a display control apparatus according to the present invention.

If the CPU 11 notices that a power-off request has been made (301) by means of, for example, the hardware switch 281, the CPU 11 rewrites the data in the display area of the video memory 41 into "1"s (or "0"s) (302). When all the data in the display area are rewritten into "1"s (or "0"s) (303), "1" is registered in the POFF bit of the power control register 46 provided in the FLCD interface 27 (304). As shown in FIG. 8, the power control register 46 has an eight-bit construction, and the POFF bit is assigned to bit 0. It is determined that the POFF bit becomes active when "1" is set in the POFF bit (bit 0). The POFF bit is inputted to the address counter 38 and the synchronization control circuit 39. When the POFF signal becomes active, the synchronization control circuit 39 forces the switch S3 to connect the address counter 38 to the address selector 35, thus switching to an entire-frame refresh cycle (305). Simultaneously, the address counter 38 clears the address data to zero for the entire-frame refresh cycle, and sequentially increments to address data to the number of the horizontal lines of the FLCD 26 (1312 lines in this embodiment) during the entire-frame refresh cycle. The lines of the FLCD 26 are sequentially rewritten into "1"s (or "0"s). When the display frame is entirely rewritten into "1"s (or "0"s), in other words, entirely refreshed (306), the FLCD displays an entirely black (or entirely white) image. The information processing system switches off the power source 28 a period long enough to allow completion of refreshment of the entire display panel of the FLCD 26 (307) after the power-off request has been made. Thus, the FLCD 26 retains the entirely black (or white) state even after the power is switched off. The above-described manner of switching off the power source 28 can be achieved by, for example, providing a capacitor having a necessary capacity in the power source 28, or controlling the switching operation of the power source 28 by means of software.

EMBODIMENT 2

While, according to Embodiment 1, the data in the display area of the video memory 41 are entirely rewritten into "1"s (or "0"s) so as to achieve an entirely black (or white) frame on the FLCD 26 when a power-off request has been made, Embodiment 2 achieves an entirely black (or white) frame on the FLCD 26 when a power-off request has been made by providing an area in the video memory 41 which is forcibly accessed and entirely rewritten into "1"s (or "0"s) when a power-off request has been made.

FIG. 5 illustrates in detail an FLCD interface 27 according to Embodiment 2. The FLCD interface 27 according to this embodiment further comprises a data bus driver 47, a memory address register 48 for storing addresses which the CPU 11 accesses in the video memory 41 when the POFF signal is active, and an address selector (2) 49 which forcibly transfers to the video memory 41 the output of the address selector 35 during the normal operation and the output of the memory address register 48 when a power-off request has been made.

The operation performed when a power-off request has been made will be described hereinafter.

When a power-off request has been made, the CPU 11 sets "1" in the POFF bit of the power control register 46 provided in the FLCD interface 27, thus turning the POFF signal active. When the POFF signal becomes active, the synchronization control circuit 39 forcibly operates the switch S3 so as to achieve an entire-frame refresh cycle. Simultaneously, the address selector (2) 49 is switched so as to transfer to the video memory 41 the address data received from the memory address register 48 instead of the address data received from the address selector 35. The memory address register 48 outputs the address data corresponding to an address outside the display area, which address data has been inputted thereto via the data bus driver 47. The video memory 41 stores one line of "1"s (or "0"s) set beforehand at an address corresponding the address data registered in the memory address register 48. When an entire-frame refresh cycle is started, the lines constituting the display frame are sequentially rewritten into "1"s (or "0"s). When the display frame is entirely rewritten into "1"s (or "0"s), that is, entirely refreshed, the FLCD 26 displays an entirely black (or white) frame. The information processing system switches off the power source for a period long enough to allow completion of refreshment of the entire display panel of the FLCD 26 after a power-off request has been made. Thus, the FLCD 26 retains the entirely black (or white) state even after the power source has been switched off.

Figure 6:
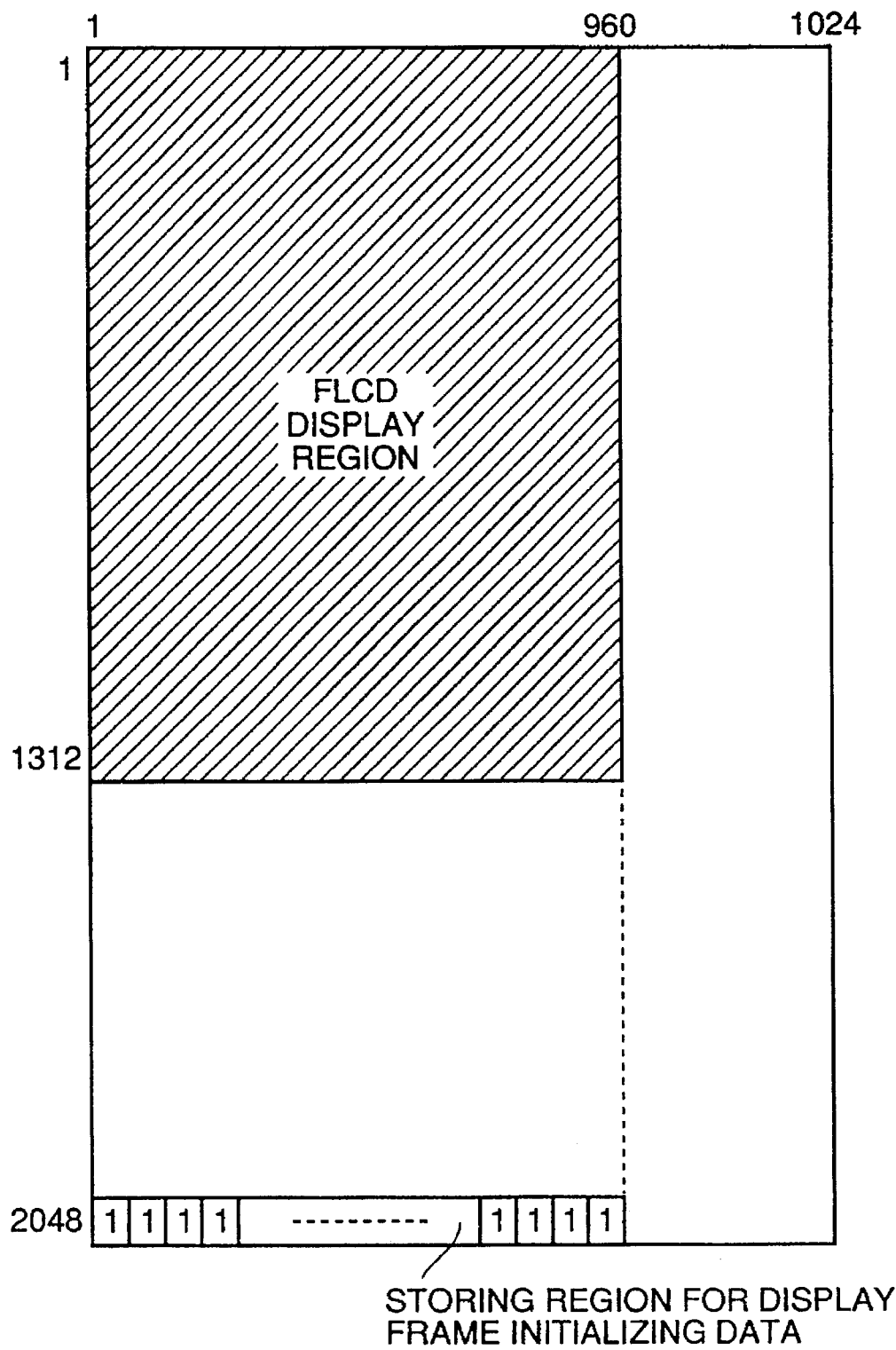
FIG. 6 illustrates the mapping of the video memory in the FLCD interface shown in FIG. 5.

FIG. 6 illustrates the video memory 41 including the display area. Provided that video memory 41 has a memory capacity of 256 Kbytes and that there are 1024 pixels along a horizontal line, then the number of the pixels along a vertical line is 2048. Further, provided that the display area corresponding to the display panel of the FLCD 26 has 960 bits along a horizontal line and 1312 bits along a vertical line and that one bit is assigned to one pixel (1 bit/pixel), the FLCD display area takes up an area indicated by a shadowed area (FIG. 6) in the video memory 41. An area outside the FLCD display area is set aside for storing one line of data; for example, the 2048th horizontal line of pixels is set aside. If "1"s (or "0"s) are written into this area beforehand and it is preset that this area will be forcibly accessed when a power-off request has been made, an entire-frame refresh cycle will achieve an entirely black (or white) frame of the display panel of the FLCD 26.

EMBODIMENT 3

While Embodiment 2 achieves an entirely black (or white) frame on the display panel of the FLCD 26 when a power-off request has been made, by forcibly switching the address data to be transferred to the video memory 41 to the address data corresponding to the address outside the display area where "1"s (or "0"s) are written beforehand, Embodiment 3 achieves an entirely black (or white) frame on the display panel of the FLCD 26 by forcibly transferring to the FLCD 26 the data outputted by a memory data register in which identical data (either "1"s or "0"s) are written beforehand, instead of the data outputted by the video memory 41.

FIG. 7 illustrates in detail an FLCD interface 27 according to Embodiment 3. Compared with the FLCD interface 27 according to Embodiment 1, the FLCD interface 27 according to Embodiment 3 further comprises a data bus driver 52, a memory data register 50 storing data which is transferred to the FLCD 26 when the POFF signal is active, and a data selector 51 for forcibly transferring to the FLCD 26 the output data from the video memory 41 during the normal operation and the output data from the memory data register 50 when the POFF signal is active.

The operation performed when a power-off request has been made will be described hereinafter.

When a power-off request has been made, the CPU 11 sets "1" in the POFF bit of the power control register 46 provided in the FLCD interface 27, thus turning the POFF signal active. When the POFF signal becomes active, the synchronization control circuit 39 forcibly operates the switch S3 so as to achieve an entire-frame refresh cycle. Simultaneously, the data selector 51 is switched so as to forcibly transfer to the FLCD 26 the output data from the memory data register 50 instead of the output data from the video memory 41. The data (either "1"s or "0"s) outputted by the memory data register 50 have been inputted therein by means of the data bus driver 52. When an entire-frame refresh cycle is started, the lines constituting the display frame are sequentially rewritten into "1"s (or "0"s). When the display frame is entirely rewritten into "1"s (or "0"s), that is, entirely refreshed, the FLCD 26 displays an entirely black (or white) frame. The information processing system switches off the power source for a period long enough to allow completion of refreshment of the entire display panel of the FLCD 26 after a power-off request has been made. Thus, the FLCD 26 retains the entirely black (or white) state even after the power source has been switched off.

According to these embodiments, because the entire display frame of the FLCD is rewritten into an entirely black (or white) frame before the power source is switched off, the display panels of the FLCD latently retains the entirely black (or white) frame even after being switched off due to the bistability of FLCs (ferroelectric liquid crystals).

Although, in the above-described embodiments, the display frame is rewritten by using entirely black (or white) image data before the power source is switched off, a pre-stored image data may be used instead. More specifically, image data is stored in a backed-up memory by, for example, scanning a desired image. When a power-off request has been made, the image data is read out from the backed-up memory and written into a video memory, thus achieving the desired image on the FLCD.

As described above, an FLCD latently retains an image the FLCD displayed when it was last powered off, because of the bistability of FLCs, an essential characteristic of FLCs. Therefore, when powered on, an FLCD is liable to display an image which the FLCD has latently retained, and while being powered off, the latent image retained by an FLCD may be made visible by light incident thereon. If that happens, an FLCD controlled by the display control apparatus according to the present invention only shows an entirely black (or white) image or a preset image while a FLCD according to the conventional art may show an undesired image, which could include confidential information, to an undesired viewer.

While the present invention has been described with reference to what are presently considered to be the preferred embodiments, it is to be understood that the invention is not limited to disclosed embodiments. To the contrary, the invention is intended to cover various modifications and equivalent arrangements included within the spirit and scope of the appended claims.

What is claimed is:

1. A display control apparatus comprising:
   storing means having memories for storing display data to be displayed on a display panel;
   display control means for achieving an image on the display panel in accordance with the data stored in said storing means;
   detecting means for detecting a power-off signal; and
   rewriting means for rewriting the display data stored in said storing means by a predetermined data when said detecting means detects a power-off signal, wherein the display panel is initialized by reading the predetermined data from said storing means and said display control means achieves a refreshed image on the display panel corresponding to the predetermined data thereby erasing the image on the display panel and displaying the refreshed image on the display panel.

2. A display control apparatus according to claim 1, further comprising data storing means for storing the predetermined data, wherein said rewriting means rewrites said storing means by using the predetermined data stored in said data storing means.

3. A display control apparatus according to claim 2, wherein the predetermined data are identical data indicating one of black and white.

4. A display control apparatus according to claim 3, wherein said display control means achieves one of a black or white predetermined refreshed image on a ferroelectric liquid crystal display in accordance with the predetermined data rewritten from said data storing means by said rewriting means to said storing means, wherein the predetermined refreshed image achieved on the ferroelectric liquid crystal display is retained on the display after the power to said display control apparatus is off.

5. A display control apparatus according to claim 2, wherein the predetermined data corresponds to a line of the display panel, and wherein said rewriting means rewrites said storing means by using the predetermined data corresponding to a line of the display panel.

6. A display control apparatus according to claim 1, wherein said display control means achieves an image on a ferroelectric liquid crystal display.

7. A display control method for displaying images on a display panel in accordance with information stored in memory, comprising the steps of:
storing display data in a memory;
displaying an image on the display panel in accordance with the stored display data;
detecting a power-off signal;
rewriting the display data stored in the memory by a predetermined data when the power-off signal is detected;
initializing the display panel by reading the predetermined data from the memory and displaying a refreshed image on the display panel corresponding to the predetermined data; and
disconnecting the power.

8. A display control method according to claim 7, further comprising the step of storing the predetermined data into a data storing memory, wherein the step of rewriting the display data in the memory uses the predetermined data from the data storing memory.

9. A display control method according to claim 8, further comprising the step of providing the predetermined data to be identical data indicating one of black and white.

10. A display control method according to claim 8, further comprising the step of corresponding the predetermined data to a line of the display panel, and using the predetermined data to initialize the memory.

11. An information processing system comprising:
display means, including a display panel, for displaying information;
storing means having memories for storing information to be displayed on said display panel;
display control means for achieving an image on said display means in accordance with the information stored in said storing means;
power means for supplying power to said information processing system;
switch means for switching said power means on and off;
detecting means for detecting a power-off signal; and
rewriting means for rewriting the information stored in said storing means by a predetermined data when said detecting means detects a power-off signal, wherein the display panel is initialized by reading the predetermined data from said storing means and displaying a refreshed image on the display panel corresponding to the predetermined data thereby erasing the image on said display panel and displaying the refreshed image.

12. An information processing system according to claim 11, further comprising data storing means for storing the predetermined data, wherein said rewriting means rewrites said storing means by using the predetermined data stored in said data storing means.

13. An information processing system according to claim 12, wherein the predetermined data are identical data indicating one of black and white.

14. An information processing system according to claim 12, wherein said predetermined data corresponds to a line of said display panel, and wherein said rewriting means rewrites said storing means by using said predetermined data corresponding to a line of said display panel.

15. An information processing system according to claim 12, further comprising reading means for reading an image, wherein the image data read by said reading means is stored in said storing means.

16. A display control apparatus comprising:
storing means having memories for storing display data to be displayed on a display panel;
display control means for achieving an image on the display panel in accordance with the display data stored in said storing means;
detecting means for detecting a signal which initiates achieving a predetermined refreshed image to be displayed on the display panel by said display control means; and
rewriting means for rewriting the display data stored in said storing means by a predetermined data when said detecting means detects the signal which initiates achieving the predetermined refreshed image on the display panel, wherein the display panel is initialized with the predetermined refreshed image when said display control means reads the predetermined data from said storing means and achieves the predetermined refreshed image corresponding to the predetermined data by displaying the predetermined refreshed image on the display panel thereby erasing the image on the display panel and displaying the refreshed image.

17. A display control apparatus according to claim 16, wherein the signal which initiates achieving a predetermined display image on the display panel is a power-off signal.

18. A display control apparatus according to claim 16, further comprising data storing means for storing the predetermined data, wherein said rewriting means rewrites said storing means by using the predetermined data stored in said data storing means.

19. A display control apparatus according to claim 18, wherein the predetermined data are identical data indicating a predetermined display image as one of black and white.

20. A display control apparatus according to claim 19, wherein the signal detected by said detecting means which initiates achieving a predetermined image to be displayed on the display panel by said display control means is a power-off signal and said display control means achieves one of a black or white predetermined refreshed image on a ferroelectric liquid crystal display, wherein the black or white predetermined refreshed image achieved on the ferroelectric liquid crystal display is retained on the display after the power to said display control apparatus is off.

21. A display control apparatus according to claim 18, wherein the predetermined data corresponds to a line of the display panel, and wherein said rewriting means rewrites said storing means by using the predetermined data corresponding to a line of the display panel.

22. A display control apparatus according to claim 16, wherein said display control means achieves an image on a ferroelectric liquid crystal display.

23. A display control method for displaying images on a display panel in accordance with information stored in a memory, comprising the steps of:

storing display data in a memory;

displaying an image on the display panel in accordance with the stored display data;

detecting a signal which initiates achieving a predetermined refreshed image on the display panel;

rewriting the display data stored in the memory by a predetermined data corresponding to the predetermined refreshed image when the signal is detected;

initializing the display panel by reading the predetermined data from the rewritten memory and displaying the predetermined refreshed image on the display panel with the predetermined data; and disconnecting the power.

24. A display control method according to claim 23, further comprising the step of using a power-off signal as the signal to achieve a predetermined display image on the display panel.

25. A display control method according to claim 23, further comprising the step of storing predetermined data into a data storing memory, wherein the step of rewriting the display data in the memory uses the predetermined data from the data storing memory.

26. A display control method according to claim 25, further comprising the step of providing the predetermined data to be identical data indicating a predetermined refreshed image as one of black and white.

27. A display control method according to claim 26, further comprising the step of orienting the cells of a ferroelectric liquid crystal display to achieve the predetermined refreshed image on the display panel as one of black or white.

28. A display control method according to claim 25, further comprising the step of corresponding the predetermined data to a line of the display panel, and using the predetermined data to initialize the memory.

* * * * *

UNITED STATES PATENT AND TRADEMARK OFFICE
CERTIFICATE OF CORRECTION

PATENT NO. : 5,627,569
DATED       : May 6, 1997
INVENTOR(S) : Matsuzaki et al.

It is certified that error appears in the above-identified patent and that said Letters Patent is hereby corrected as shown below: On the title page:

[56] FOREIGN PATENT DOCUMENTS:

"1263099 10/1989 Japan
3296713 12/1991 Japan" should read
--1-263099 10/1989 Japan
3-296713 12/1991 Japan--.

COLUMN 3:

Line 12, "mode a" should read --mode--;
Line 40, "board 22" should read --board 23--; and
         "mouse 23" should read --mouse 24--.

COLUMN 5:

Line 27, "substantially" should read
--substantially by--.

Signed and Sealed this

Twenty-first Day of October 1997

Attest:

BRUCE LEHMAN

Attesting Officer          Commissioner of Patents and Trademarks